United States Patent
Sadana et al.

(10) Patent No.: US 11,175,966 B2
(45) Date of Patent: Nov. 16, 2021

(54) SYSTEM AND METHOD OF A MANAGING MULTIPLE DATA CENTERS

(71) Applicant: Arista Networks, Inc., Santa Clara, CA (US)

(72) Inventors: Anshul Sadana, Santa Clara, CA (US); Andre Pech, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/233,829

(22) Filed: Aug. 10, 2016

(65) Prior Publication Data

US 2017/0249195 A1    Aug. 31, 2017

Related U.S. Application Data

(60) Provisional application No. 62/300,711, filed on Feb. 26, 2016.

(51) Int. Cl.
*G06F 9/50* (2006.01)
*H04L 29/08* (2006.01)
*G06F 9/48* (2006.01)

(52) U.S. Cl.
CPC .......... *G06F 9/5083* (2013.01); *G06F 9/4881* (2013.01); *H04L 67/10* (2013.01)

(58) Field of Classification Search
CPC .......... G06F 9/50–5094; G06F 9/5083; G06F 9/4881; H04L 67/10
See application file for complete search history.

(56) References Cited

U.S. PATENT DOCUMENTS

| | | | | |
|---|---|---|---|---|
| 5,751,963 A | * | 5/1998 | Umetsu | H04L 41/046 709/223 |
| 8,015,604 B1 | * | 9/2011 | Tidwell | H04L 41/046 709/224 |
| 8,341,626 B1 | * | 12/2012 | Gardner | G06F 9/4856 718/1 |
| 9,391,921 B1 | * | 7/2016 | Riddle | H04L 41/0893 |
| 2003/0061323 A1 | * | 3/2003 | East | H04L 41/22 709/223 |
| 2004/0205414 A1 | * | 10/2004 | Roselli | H02H 3/05 714/39 |
| 2005/0131912 A1 | * | 6/2005 | Lin | H04L 45/02 |

(Continued)

OTHER PUBLICATIONS

Monitoring Elastically Adaptive Multi-Cloud Services Demetris Trihinas, George Pallis, Marios D. Dikaiakos Published: Dec. 2015.*

(Continued)

*Primary Examiner* — Emerson C Puente
*Assistant Examiner* — Paul V Mills
(74) *Attorney, Agent, or Firm* — Fountainhead Law Group P.C.

(57) ABSTRACT

A method and apparatus of a device that automates a task over a network that includes a plurality of data centers is described. In an exemplary embodiment, the device receives state change information from a plurality of devices in the plurality of data centers. In addition, the device generates an overall state for the network. The device further receives a task to be performed over the plurality of data centers. The device additionally schedules the task to be performed using the overall network state.

20 Claims, 8 Drawing Sheets

(56) References Cited

U.S. PATENT DOCUMENTS

| | | | | |
|---|---|---|---|---|
| 2006/0056618 | A1* | 3/2006 | Aggarwal | G06Q 10/0631 380/1 |
| 2007/0250620 | A1* | 10/2007 | Shah | H04L 41/0622 709/224 |
| 2007/0282983 | A1* | 12/2007 | Gujarathi | G06F 9/5055 709/223 |
| 2007/0282988 | A1* | 12/2007 | Bornhoevd | G06Q 10/00 709/223 |
| 2008/0281963 | A1* | 11/2008 | Fletcher | H04L 41/0853 709/224 |
| 2008/0307088 | A1* | 12/2008 | Chen | G06F 11/3495 709/224 |
| 2010/0211669 | A1* | 8/2010 | Dalgas | G06F 9/5027 709/224 |
| 2011/0083077 | A1* | 4/2011 | Nair | G06Q 10/06 715/735 |
| 2012/0144032 | A1* | 6/2012 | Read | H04Q 9/00 709/224 |
| 2012/0290705 | A1* | 11/2012 | Befort | G06Q 10/06 709/224 |
| 2013/0007261 | A1* | 1/2013 | Dutta | G06F 11/324 709/224 |
| 2013/0055155 | A1* | 2/2013 | Wong | G06F 8/65 715/810 |
| 2014/0059533 | A1* | 2/2014 | Calder | G06F 8/65 717/171 |
| 2014/0136687 | A1* | 5/2014 | Patel | H04L 41/147 709/224 |
| 2015/0229546 | A1* | 8/2015 | Somaiya | G06F 11/328 715/736 |
| 2016/0134504 | A1* | 5/2016 | Crudele | G06F 9/5077 709/224 |
| 2016/0344610 | A1* | 11/2016 | Robinette | H04L 43/50 |
| 2016/0364226 | A1* | 12/2016 | Takano | G06F 9/5077 |
| 2016/0380925 | A1* | 12/2016 | Agarwal | H04L 45/60 370/401 |

OTHER PUBLICATIONS

Domain-partitioned element management systems employing mobile agents for distributed network management Anish Saini and Atul Mishra (Year: 2014).*

Ex parte Nehls USPTO BPAI precedential decision (Year: 2008).*

Routing table definition Margaret Rouse Retrieved from:https://searchnetworking.techtarget.com/definition/routing-table (Year: 2007).*

Scalable SNMP-Based Monitoring Systems for Network Computing Rajesh Subramanyan p. 1-38, 85-104, 117-142 (Year: 2002).*

Building Distributed Management Applications with the IETF Script MIB Jürgen Schönwälder, Jürgen Quittek, and Cornelia Kappler (Year: 2000).*

An Architecture for Distributed and Flexible Management of High-Layer Protocols and Network Services Luciano Gaspary Luis F. Balbinot, Roberto Storch, Fabricio Wend and Liane Tarouco (Year: 2001).*

A Network-State Management Service Peng Sun, Ratul Mahajan Jennifer Rexford, Lihua Yuan Ming Zhang Ahsan Arefin (Year: 2014).*

Up in the clouds: A Taxonomical Analysis of Network Management Functionalities from a Network as a Service Perspective Roberto Riggio, Slawomir Kuklinski, Tinku Rasheed, David Andreatta, David Tacconi and Fabio Antonelli (Year: 2012).*

Lessons from Giant-Scale Services Eric Brewer (Year: 2001).*

Modular Software Upgrades for Distributed Systems Sameer Ajmani, Barbara Liskov, and Liuba Shrira (Year: 2006).*

\* cited by examiner

SYSTEM AND METHOD OF A MANAGING MULTIPLE DATA CENTERS

RELATED APPLICATIONS

Applicant claims the benefit of priority of prior, provisional application Ser. No. 62/300,711, filed Feb. 26, 2016, the entirety of which is incorporated by reference.

FIELD OF INVENTION

This invention relates generally to data networking, and more particularly, to managing multiple data centers of an enterprise.

BACKGROUND OF THE INVENTION

An enterprise may have multiple data centers that are used to support operations of the enterprise. For example, the enterprise may use a data center for e-commerce, online transactions, database transactions, enterprise resource planning, and/or various other types of operations of the enterprise. In one embodiment, a data center is a facility used to house computer systems, networking equipment, storage system, and/or other types of equipment for an enterprise. Each of the data centers can house up to thousands of devices, where each of the devices can be a computer system, networking equipment, storage system, or some other type of device used in a data center.

In one embodiment, it can be difficult to manage the tens of thousands of devices (or more) that are located in these multiple data centers. One way of managing the devices in the data centers is for each data center to have a network management station (NMS) that is used to manage the devices in the data center that includes the NMS. Typically, an NMS manages each of the devices in the data center using the Simple Network Management Protocol (SNMP). An SNMP-based NMS, however, does not scale well when the number of devices in that data center approaches 5000 or more devices. Moreover, by having an NMS in each of the data centers, it is hard for administrator to get an overall picture of the performance and function of the data centers in network. This is because there is not a straightforward way to automatically compile the data in each of the NMSes to give the overall network picture.

An alternative way to manage the devices in the data centers is to manage each of the devices using a cloud-based service. In this embodiment, there is not an NMS physically residing in the data center. Instead, the cloud-based service is coupled to the devices in each of the data centers and manages each of those devices. This can be a problem for an enterprise because the cloud-based service has access to all of the data center operating data as this operating data is not stored on a device that resides in one of the data centers. The enterprise may not want to expose this operating data to a device outside of the data center for security reasons. Furthermore, the enterprise may be constrained by custom or regional laws as to allowing cloud-based management. Constraints that discourage the enterprise from using a cloud-based service to manage the devices and the data centers.

SUMMARY OF THE DESCRIPTION

A method and apparatus of a device that automates a task over a network that includes a plurality of data centers is described. In an exemplary embodiment, the device receives state change information from a plurality of devices in the plurality of data centers. In addition, the device generates an overall state for the network. The device further receives a task to be performed over the plurality of data centers. The device additionally schedules the task to be performed using the overall network state.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
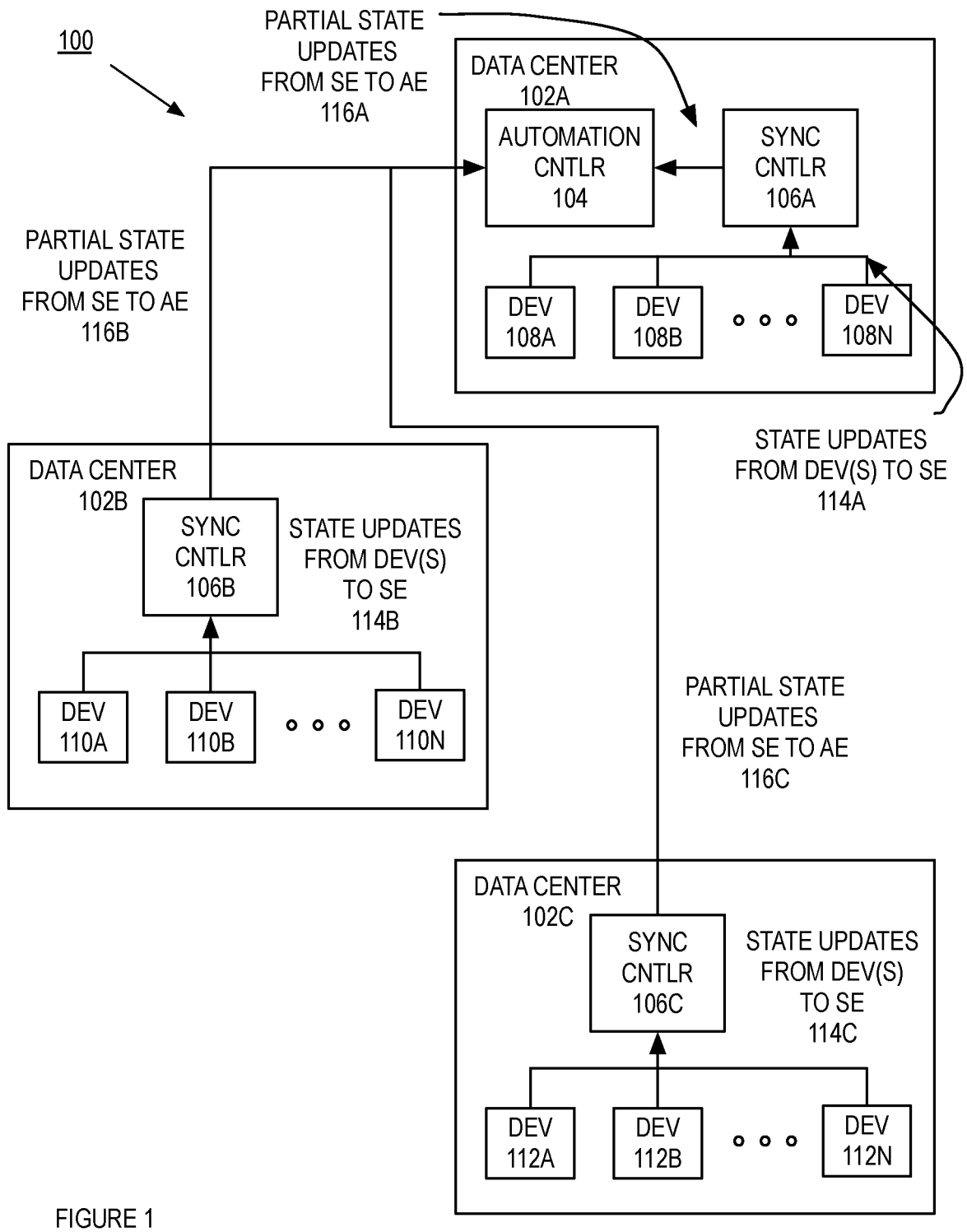
FIG. 1 is a block diagram of one embodiment of a network of multiple data centers of an enterprise, where each of the devices in the data centers report updates to a synchronization controller in the data center and the synchronization controllers reporting state to an automation controller.

A method and apparatus of a device that automates a task over a network that includes a plurality of data centers is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that automates a task over a network that includes a plurality of data centers is described. In one embodiment, a device receives state change information from multiple synchronization controllers in multiple data centers. Each of the data centers includes up to thousands of devices, where each of these devices report each state change to the synchronization controller for that data center. In one embodiment, the state change information can include any or all changes to the state of that device. For example and in one embodiment, changes to the state can include: network interface counters, command line changes, network management system based changes, and automatic state changes. The synchronization controllers take the received state change updates and forwards some or all theses state change updates to the device. For example and in one embodiment, the synchronization controller sends all of the received state change updates except for forwarding state changes.

The device takes the received state change updates and builds an overall state of the network. In one embodiment, the overall network state can include resource usage of each device in the network, resource usage of each of the data centers, configuration of the each of the devices, topology of each data center, topology of the network that includes the data centers, error counters, fault indications, and/or other types of network state information. With the overall network state, the device can perform automated tasks over the multiple data centers. For example and in one embodiment, the device can schedule software upgrades on the network elements of the different data centers so as to minimize the disruption of this upgrade. In this example, the device determines data center resource usage for each data center. Using this determination, and in another example and embodiment, the device can use the overall network state to determine which bugs might be triggered by which devices.

FIG. 1 is a block diagram of one embodiment of a network of multiple data centers of an enterprise, where each of the devices in the data centers report updates to a synchronization controller in the data center and the synchronization controllers reporting state to an automation controller. In FIG. 1, network 100 includes data centers 102A-C that are coupled together via a data communications network (not illustrated). In one embodiment, a data center is a facility used to house computer systems, networking equipment, storage system, and/or other types of equipment for an enterprise. Each of the data centers 102A-C can house up to thousands of devices, where each of the devices can be a computer system, networking equipment, storage system, or some other type of device used in a data center. In one embodiment, each of the devices is coupled to the data communications network and can be managed by a management device. Each of the data centers 102A-C may be located in a separate region that is geographically remote from the other data centers 102A-C. For example and in one embodiment, each of the data centers 102A-C may be located in a different region in a country, such as data center 102A may be in San Francisco, data center 102B may be in Dallas, and data center 102C may be in New York. In another embodiment, each of the data centers 102A-C may be located in different countries and/or continents, for example, data center 102A may be located in the United States, data center 102B may be located in China, and data center 102C may be located in Europe. while in one embodiment, network 100 is illustrated with 3 data centers 102A-C, in alternative embodiments, network 100 may have more or less data centers.

In one embodiment, it can be difficult to manage the possibly tens of thousands of devices (or more) that are located in these multiple data centers 102A-C. One way of managing the devices in the data centers 102A-C is for each data center 102A-C to have a network management station (NMS) that is used to manage the devices in the data center that includes the NMS. Typically, an NMS manages each of the devices in the data center using the Simple Network Management Protocol (SNMP). An SNMP-based NMS, however, does not scale well when the number of devices in that data center approaches 5000 or more devices. Moreover, by having an NMS in each of the data centers 102A-C, it is hard for administrator to get an overall picture of the performance and function of the data centers 102A-C in network 100. This is because there is not a straightforward way to automatically compile the data in each of the NMSes to give the overall network picture.

An alternative way to manage the devices in the data centers 102A-C is to manage each of the devices using a cloud-based service. In this embodiment, there is not an NMS physically residing in the data center. Instead, the cloud-based service is coupled to the devices in each of the data centers 102A-C and manages each of those devices. This can be a problem for an enterprise because the cloud-based service has access to all of the data center operating data as this operating data is not stored on a device that resides in one of the data centers 102A-C. The enterprise may not want to expose this operating data to a device outside of the data center for security reasons. Furthermore, the enterprise may be constrained by custom or regional laws as to allowing cloud-based management. Constraints that discourage the enterprise from using a cloud-based service to manage the devices and the data centers 102A-C.

As illustrated in FIG. 1, and in one embodiment, network 100 includes a two-tier system to manage the data center devices and to automate tasks that are used to manage those devices in the data center 102A-C. In one embodiment, each of the data centers 102A-C can include hundreds or thousands of devices. For example and in one embodiment, data center 102A includes devices 108A-N, data center 102B includes devices 110A-N, and data center 102C includes devices 112A-N. Data centers 102A-C can include differing numbers of devices in each of these data centers. As described above, each of the devices 108A-N (or 110A-N, 112A-N) can be a computer system, network element, storage device, or another type of device that is managed by a network connection. In one embodiment, a computer system can be a personal computer, laptop, server, mobile device (e.g., smartphone, laptop, personal digital assistant, music playing device, gaming device, etc.), and/or any device capable of executing a process. In one embodiment, the network element can be switch, router, hub, bridge, gateway, etc., or any type of device that can allow access to a network. In one embodiment, the network element can be a virtual machine. In one embodiment, any of the devices 108A-N (or 110A-N, 112A-N) can be a virtual machine or can be a device that hosts one or more virtual machines. In one embodiment, a storage system can be a device capable of providing storage for other devices (e.g., server, networked storage device, distributed storage, redundant storage, and/or another type of device being capable of providing storage for another device).

In one embodiment, the devices in these data centers 102A-C are managed using a two-tier structure. In this embodiment, each of the data centers 102A-C includes a synchronization controller 106A-C, respectively, that is coupled to the devices in the respective data center. For example and in one embodiment, synchronization controller 106A is coupled to devices 108A-N, synchronization controller 106B is coupled to devices 110A-N, and synchronization controller 106C is coupled to devices 112A-N. In one embodiment, each of the synchronization controllers 106A-C is coupled to the respective devices via a high-speed communications network (e. g., 1 Gbps or 10 Gbps network). In this embodiment, each of the synchronization controllers 106A-C receives state change information from each of the devices coupled to that synchronization controller 106A-C. In one embodiment, the state change information can include any or all changes to the state of that device. For example and in one embodiment, changes to the state can include: network interface counters, command line changes, network management system based changes, and automatic state changes. If the device is a computer system, changes to the state can include: resource usage, configuration changes, counter updates, and other types of state change for a computer system. For example and in one embodiment, the state change can include for any or all available sources within a network element, including from various levels of the control plane software system (e.g., agent state, system logs, kernel state), shared memory system (e.g., routing tables, shared memory counters), and platform specific hardware state (e.g., hardware internal counters, buffer analysis data, etc.). In one embodiment, the forwarding state of a device can include routes, address information, address resolution information, and/or other types of forwarding information change. If the device is a storage device, changes to the state can include: resource usage, configuration changes, counter updates, and other types of state change for a storage device. For example and in one embodiment, the synchronization controller can receive state update changes as described in U.S. patent application Ser. No. 15/165,329, entitled "TRACKING STATE OF COMPONENTS WITHIN A NETWORK ELEMENT" filed on May 26, 2016 and U.S. patent application Ser. No. 15/165,358, entitled "DATA ANALYTICS ON INTERNAL STATE" filed on May 26, 2016, which are incorporated by reference herein.

With the accumulated state change information from the devices in that data center, the synchronization controller 106A-C has a current state for each of the devices in the data center as well as the ability to reconstruct the historical state for each of those devices. Using this state change information, and in one embodiment, each of the synchronization controllers 106A-C forwards some or all of the state change information collected by that synchronization controller. For example and in one embodiment, each of the synchronization controllers 106A-C forwards all of the state change information collected from the network elements in the respective data center except for the forwarding state change information. In this example, each of the synchronization controllers 106A-C would forward state change information such as described above.

In one embodiment, there can be scaling challenges for a management device (e.g., an NMS) when numerous devices across multiple datacenters: (1) Update rate (e.g., how quickly can the management device can get changes from each device; and (2) Reaction latency (e.g., how quickly can management device can make a change once the management device can get an update from a device). In this embodiment, by having a synchronization controller helps in both of these challenges. The synchronization controller 106A-C can aggregate state updates from the devices, make intermediate calculations, and return the result of that intermediate calculation to the automation controller 104. The automation controller 104 can combine calculation with information learned from other synchronization controllers. In addition, the automation controller 104 can configure the synchronization controller 106A-C with desired behavior, where the synchronization controller 106A-C can update devices in the data center 102A-C local to that synchronization controller 106A-C in response to changes to local devices, without having to get the automation controller 104 involved.

As will be described further below, the automation controller 104 can be used to schedule network wide upgrades and bug alerts. In one embodiment, for a network wide upgrade, the automation controller 104 can instruct the synchronization controller 106A-C to upgrade a set of devices under its control. The synchronization controller 106A-C can handle the steps of that upgrade, including monitoring for any failures or unexpected behavior during that upgrade, while the automation controller 104 gets periodic status updates before being notified that the action is complete. This monitoring step is a good example of where the synchronization controller 106A-C can get very fine grained data about what is happening during the upgrade and take actions based on the upgrade data, in a way that would be harder from the automation controller 104 due to scale and latency considerations.

In one embodiment, with respect to bug alerts, each synchronization controller 106A-C can be instructed by the automation controller 104 the set of rules and/or bugs to look for, can monitor changes to the devices under control of the synchronization controller 106A-C, and can notify the automation controller 104 when a given device is now/is no longer susceptible to a given bug.

In one embodiment, one or more of the data centers 102A-C can also include an automation controller, such as automation controller 104, that is used to receive state change information from each the synchronization controllers 106A-C. In one embodiment, the automation controllers 104 can be a computer system, a network element, or another type of device that can be used to receive state change information from the devices in the data center. In one embodiment, this state change information can include all the state change information collected by each of the synchronization controllers 106A-C except for the forwarding information (e.g., routes, address information, address resolution information, and/or other types of forwarding information). In this embodiment, the automation controller 104 takes the received state change information from the synchronization controllers 106A-C and generates an overall state of the network 100. For example and in one embodiment, the network state can be a view of the resource usage across the data centers 102A-C. Alternatively, the network state can include indications of performance issues or outages in the network 100. For example and in one embodiment, the overall network state may indicate that data center 102A is running at 75% capacity, data center 102B is running at 20% capacity, and data center 102C is running at 25% capacity.

Figure 2:
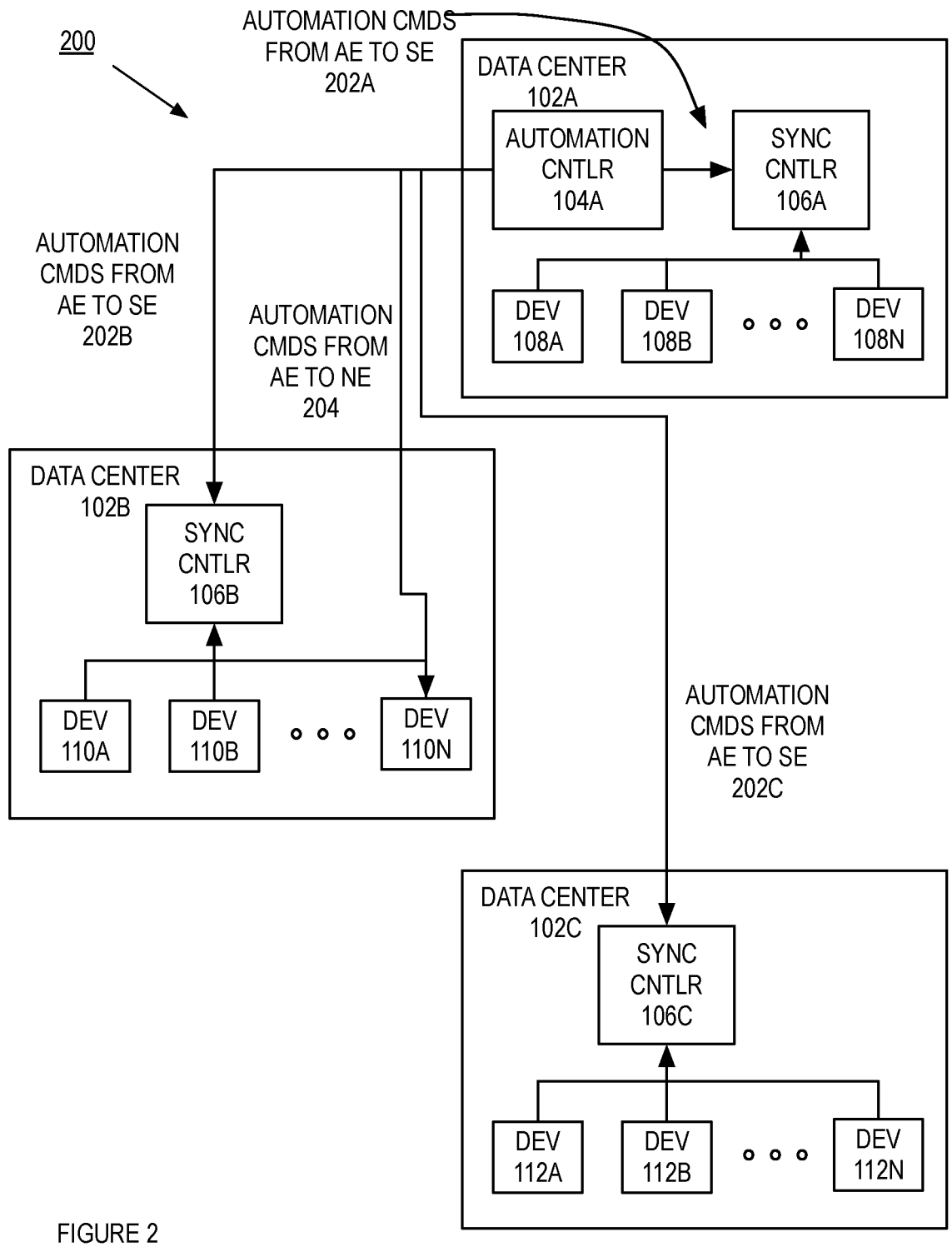
FIG. 2 is a block diagram of one embodiment of a network of multiple data centers of an enterprise, where an automation controller sends commands to devices in the data centers to perform an automated task.

FIG. 2 is a block diagram of one embodiment of a network 200 of multiple data centers of an enterprise, where an automation controller sends commands to devices in the data centers to perform an automated task. In FIG. 2, network 200 includes data centers 102A-C that are coupled via a network (not illustrated). As in FIG. 1, each of the data centers 102A-C includes a synchronization controller 106A-C that are coupled to the devices of that data center (e.g., data center 102A includes devices 108A-N coupled to synchronization controller 106A, data center 102B includes devices 110A-N coupled to synchronization controller 106B, and data center 102C includes devices 112A-N coupled to synchronization controller 106C). In addition, data center 102A includes an automation controller 104.

As described in FIG. 1, the automation controller 104 receives the state change information updates from the synchronization controllers 106A-C to generate an overall view of the network 200. In one embodiment, the automation controller 104 can further automate tasks to be performed over the multiple data centers 102A-C. Examples of these tasks can include: device software upgrade/downgrade, bug vulnerability detection, network performance monitoring, and/or other types of network automation tasks. While in one embodiment, the automation controller 104 automates the task by sending commands to each device affected by the task, in alternate embodiments, the automation controller 104 sends these commands to the synchronization controller 104 corresponding to the affected device (s) in that data center 102A-C. In this embodiment, with the view of the overall network state, the automation controller 104 can schedule these tasks to be performed in a manner that reduces the impact of the tasks to the operation of the data centers 102A-C. For example and in one embodiment, the automation controller 104 can have a task to upgrade the firmware of the network elements in the data centers 102A-C. In this example, a straightforward scheduling of the network element firmware upgrades can have a severe impact on the performance of ongoing operations in the data centers 102A-C. Upgrade of network element firmware can cause the network element to have some downtime, where this downtime could impact on the data center operation. In this example and embodiment, the automation controller 104 receives the state change updates from the synchronization controllers 106A-C and generates an overall view of the network 200. This network view can include the resource usage for each of the data centers 102A-C. If the automation controller 104 determines that the resource usage is low for some or all of the data centers 102A-C, the automation controller 104 can perform a rolling upgrade of the network element firmware in the data centers 102A-C. In this example, if the resource usage in data center 102C is low (e.g., say less than or equal to 25%), the automation controller 104 can perform the network element firmware upgrade for the network elements in data center 102C and reconfigure devices in data centers 102A-B so that there is little or no effect to the operations of other devices that may depend or use the functionality of data center 102C. Furthermore, once the network element firmware upgrade has completed in the network elements of data center 102C, the automation controller 104 can reconfigure the resources used to support the network element firmware upgrade for data center 102C and determine which of data centers 102A-B would be a viable candidate for this network element firmware upgrade. As an example, if the data center 102C was using 25% of the network 200 resources and data centers 102A-B had enough available resources that could be used during the network element firmware upgrade for data center 102C, data centers 102A-B would be reconfigured so as to make available some or all of the remaining resources available in network 200 to support enterprise operations while the data center 102C is being upgraded.

In one embodiment, assume that each of the data centers 102A-C are running at 25% of capacity and the task is to perform a software upgrade the network elements of these data centers to a new version, where the software upgrade will disrupt the operations of the data center. In this embodiment, the automation controller 104 determines that one or two of the data centers can handle the capacity of the data center(s) whose network elements are being upgrade. The automation controller 104 can reconfigure devices in these data centers such that requests for services provided by the data center(s) being upgraded are forwarded to devices in the data center(s) not affected by the network element upgrade. For example and in one embodiment, if each data center 102A-C is running at 25% capacity, the automation controller 104 can schedule the network element upgrade for data centers 102A-B and configure the data centers 102A-C such that data center 102C handles service requests normally forwarded to a device in one of the data centers 102A-B, because this data center an handle the extra capacity while the network elements in data centers 102A-B are being upgraded. With this upgrade completed in the data centers 102A-B, the automation controller 102 can configure the data centers 102A-C such that the data centers 102A-B can handle the service requests normally forwarded to a device in data center 102C. With this configuration, the automation controller 104 can upgrade the network elements in the data center 102C. Once this upgrade is completed, the automation controller 104 can reconfigure the devices in the data centers 102A-C to a configuration prior to the automation controller receiving and scheduling the update.

In another embodiment, the automation controller 104 can use the overall state of the network 200 to determine if there are any devices with bug vulnerabilities and possibly upgrade those devices with an available software upgrade. In this embodiment, the automation controller 104 can receive a list of bug vulnerabilities from a device manufacturer, where this bug vulnerability list matches known bugs with conditions or configurations that trigger this bug and possible software upgrades that can alleviate the bug as described in U.S. patent application Ser. No. 14/457,585, filed Aug. 12, 2014 entitled "Method and System for Managing Bug/Error Correction in a Network Switch." For example and in one embodiment, the automation controller 104 can receive the bug vulnerability list from a manufacturer of network elements. Using the overall network state that includes current configurations of the network elements in the network 200, the automation controller 104 can identify potential network elements which configurations matches one or more of the bugs listed in the bug vulnerability list. As an example, there may be a bug affecting a routing service for a network element of a certain model running software versions 8.0-8.2.3, where the fix is applying software version 8.2.4. The automation controller 104 can use the overall network state to find network elements of that model that are running software versions 8.0-8.2.3 in any one of the data centers 102A-C. For these identified network elements, the automation controller 104 can configure other devices in the data centers 102A-C such that the software upgrade does not affect the operation of the affected data center 102A-C. Alternatively, the automation controller 104 can schedule a hitless or near-hitless upgrade of these network elements as described in U.S. Pat. No. 9,141,373, entitled "SYSTEM AND METHOD FOR ACCELERATED SOFTWARE UPGRADES", issued on Sep. 22, 2015. The automation controller 104 can schedule the upgrades of these network elements to the software version 8.2.4 and reconfigure (as necessary) the upgraded network elements to a configuration as before the automation controller 104 received the bug vulnerability list.

In addition, and in one embodiment, the automation controller 104 can also apply rules to each of the data centers 102A-C before, during, and/or after the automation controller 104 performs the task on these data centers 102A-C. For example and in one embodiment, if the data centers 102A-C are in different countries, the automation controller 104 can apply a set of rules that are relevant for each of the countries that these data centers 102A-C reside in. In this example, data centers in different countries may have different sets of regulations and/or practices that are to be followed. The automation controller 104 can one set of rules for a data center 102A-C in one country and another set of rules for a data center 102A-C in another country.

Figure 3:
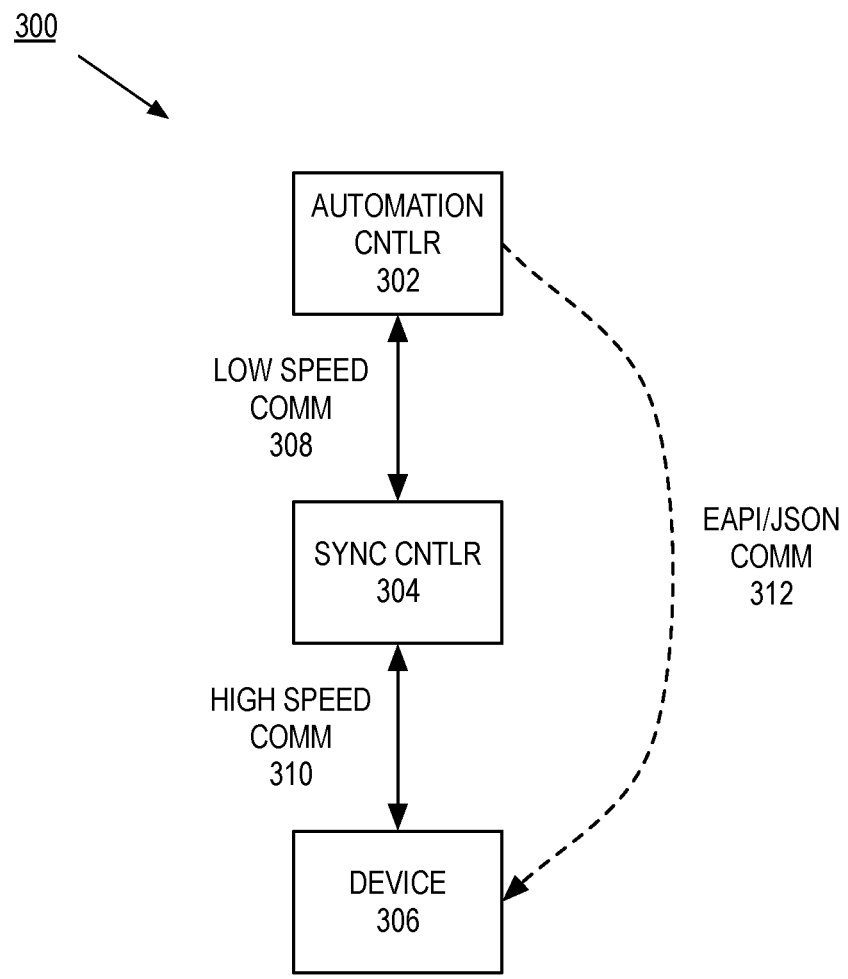
FIG. 3 is a block diagram of one embodiment of an automation controller communicating with a synchronization controller and a device.

FIG. 3 is a block diagram of one embodiments of an automation controller 302 communicating with a synchronization controller 304 and a device 306. In FIG. 3, the system 300 is illustrated with an automation controller 302 coupled to a synchronization controller 304 via low speed communication link 308. Furthermore, the synchronization controller 304 is coupled to a device 306 by a high-speed communication link 310. In one embodiment, the low-speed communication link 308 can be a 10 Mbps, 100 Mbps, 1 Gbps communication link or another type of communication link that is used to couple devices between different data centers. Furthermore, the high-speed communication link 310 can be a 1 Gbps, 10 Gbps, or another type of communication link that is used to couple devices within a data center. In one embodiment, the automation controller 302 and synchronization controller 304 are the same automation controller and synchronization controller, respectively, as described in FIGS. 1 and 2 above. In one embodiment, the automation controller 302 uses the low-speed communications link 308 to support a relatively low rate of network state change updates from the synchronization controller 304 (e.g., updates every second, every few seconds, or some other time period). In a further embodiment, the synchronization controller 304 uses the high-speed communications link 310 to support a relatively high rate of device state changes from the device 306 as described above in FIGS. 1 and 2. In another embodiment, the automation controller 302 can communicate directly with device 306 by an application programming interface (API)/Java Scripted Object Notification (JSON) protocol communications link 312. In this embodiment, the automation controller 302 uses the communication link 312 to receive state change updates from the device 306 and also to send commands to perform tasks on the device 306. In one embodiment, the automation controller uses this communication link 312 if the device is part of a branch office as will be described further in FIG. 5 below.

Figure 4:
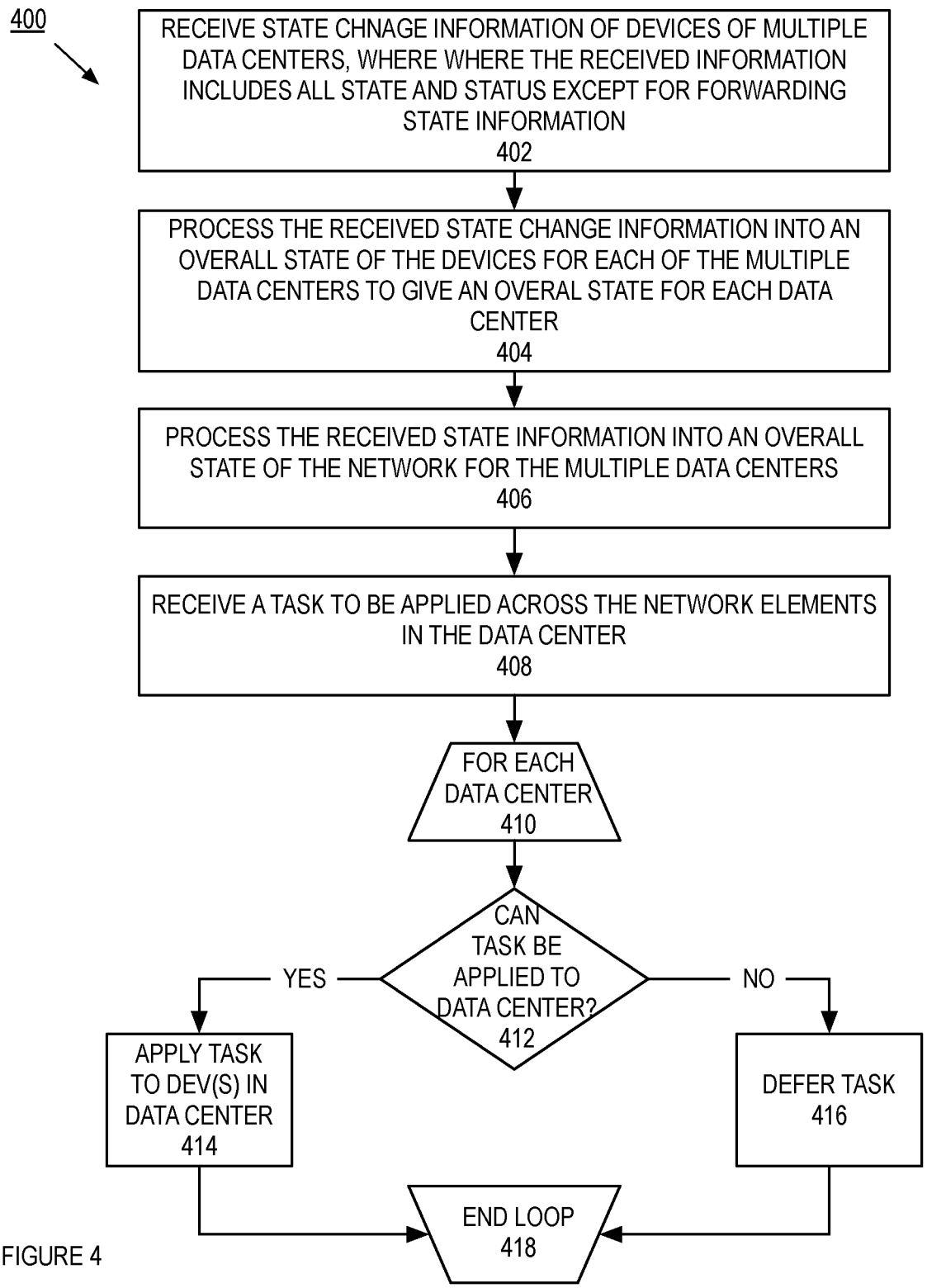
FIG. 4 is a flow diagram of one embodiment of a process to perform an automated task across multiple data centers.

FIG. 4 is a flow diagram of one embodiment of a process 400 to perform an automated task across multiple data centers. In one embodiment, process 400 is performed by an automation controller, such as the automation controller 104 as described in FIGS. 1 and 2 above. In FIG. 4, process 400 begins by receiving specialized state change information of the devices in the multiple data centers. In one embodiment, this received information includes all state change updates except for the forwarding state change information of these devices at block 402. In one embodiment, process 400 receives the specialized state change information from one or more synchronization controllers, such as the synchronization controllers 106A-C as described in FIGS. 1 and 2 above. At block 404, process 400 processes the received state change information into an overall state of the devices for each of the multiple data centers to give an overall state for each data center and the network overall. In one embodiment, the state of the data centers can include resource usage of each device in the network, resource usage of each of the data centers, configuration of the each of the devices, topology of each data center, performance of the connections between data centers, application performance between data centers, network or sub-network performance between data centers (e.g. Virtual Extended Local Area Network (VxLAN) performance), and/or other state of a data center. Process 400 processes the received state change information into an overall state of the network for the multiple data centers at block 406. In one embodiment, the overall state of the network can include resource usage of each device in the network, resource usage of each of the data centers, configuration of the each of the devices, topology of each data center, topology of the network that includes the data centers, error counters, fault indications, and/or other types of network state information. Process 400 receives a task to be applied across the devices and the data centers in this network at block 408. In one embodiment, the task can be a software upgrade/downgrade for some or all of the devices in the data centers, bug vulnerability detection, network performance monitoring, and/or other types of network automation tasks. Process 400 further performs a processing loop (blocks 410-418) to apply this task to the different data centers. At block 412, process 400 determines if the task can be applied to this data center. In one embodiment, if the resource utilization of the data center is high and this task might cause a disruption to the operations for this data center, process 400 could determine that this task should not be applied at this time. Alternatively, if the resource utilization of the data center is low or low enough that there is enough resource available in the other data centers to support the target data center being disrupted, process 400 could determine that this task be applied at this time. If the task can be applied, at block 414, process 400 applies the task to the devices in the data center. In one embodiment, process 400 applies the task by configuring some or all of the devices in the data centers in the network such that the task can be applied on a target data center without the task affecting the operations of the other data centers as described in FIG. 2 above. If the task is to be deferred, at block 416, process 400 defers this task for this data center. In one embodiment, process 400 can wait a predetermined time to perform this task again or determine a threshold at which the task can be performed. The processing loop and a block 418.

Figure 5:
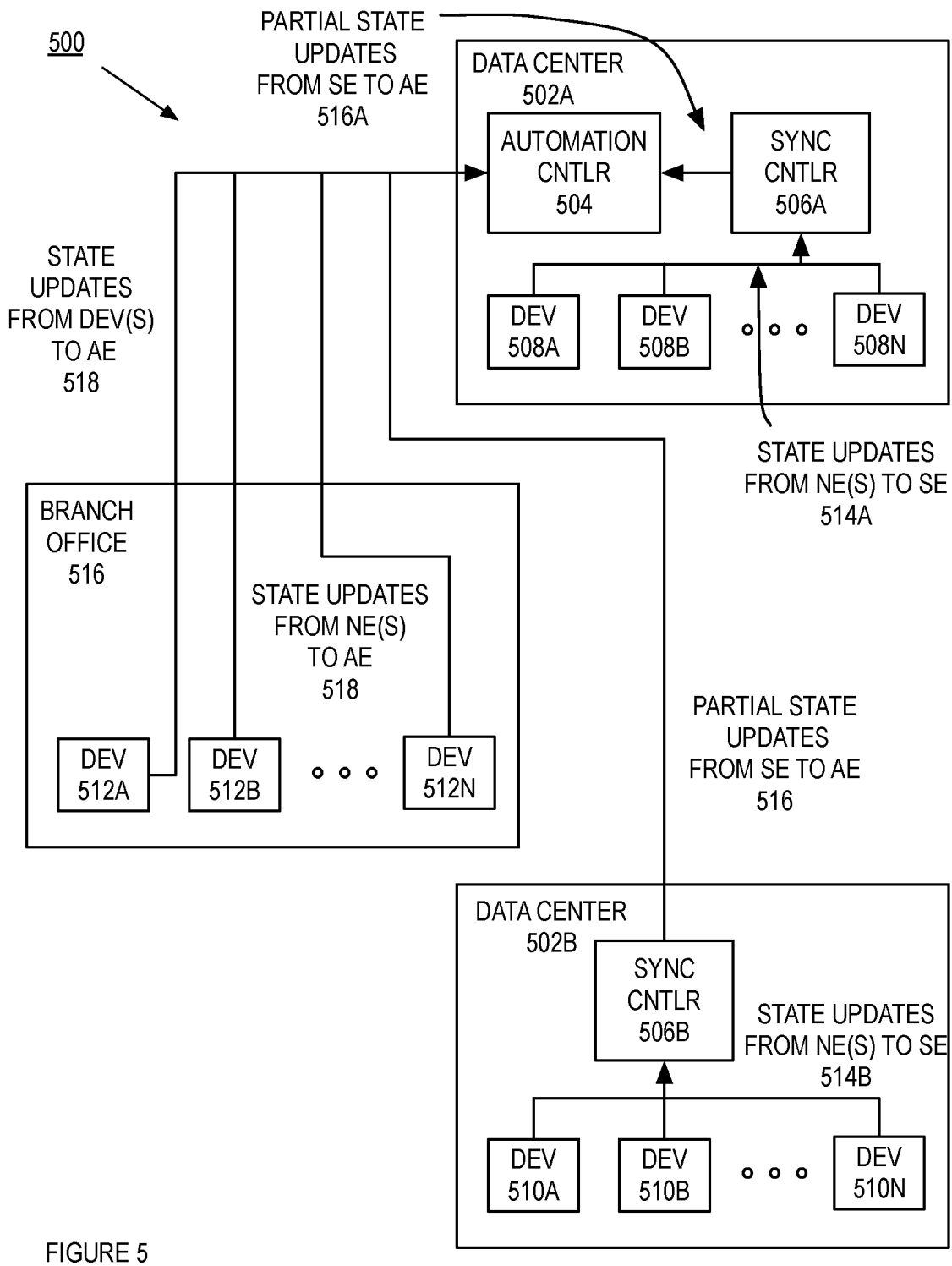
FIG. 5 is a block diagram of one embodiment of a network of multiple data centers of an enterprise, where each of the devices in the data centers report updates to a synchronization controller in the data center and devices in a branch office report updates to an automation controller.

FIG. 5 is a block diagram of one embodiment of a network 500 of multiple data centers 502A-B of an enterprise, where each of the devices in the data centers 502A-B report updates to a synchronization controller 506A-B in the data center and devices in a branch office report updates to an automation controller 504. In FIG. 5, network 500 includes data centers 502A-B that are coupled via a network (not illustrated). As in FIG. 1, each of the data centers 502A-B includes a synchronization controller 106A-C that are coupled to the devices of that data center (e.g., data center 502A includes devices 508A-N coupled to synchronization controller 506A and data center 502B includes devices 510A-N coupled to synchronization controller 506B. In addition, data center 502A includes an automation controller 504. As described in FIG. 1, the automation controller 504 receives the state change information updates from the synchronization controllers 506A-B to generate an overall view of the network 500. In one embodiment, the automation controller 504 can further automate tasks to be performed over the multiple data centers 502A-B. While in one embodiment, one branch office 516 and two data centers 502A-B are illustrated, in alternate embodiments, there can be more or less branch offices and/or data centers. For example and in one embodiment, the network 500 can include 2-4 data centers and 2000 or more branch offices.

In one embodiment, the automation controller 504 receives state change updates from devices 512A-N that are part of the branch office 516. In this embodiment, the branch office 516 is an enterprise site that includes the devices 512A-N but does not include a synchronization controller. For example and in one embodiment, the branch office 516 is a site that includes a smaller number of devices to be managed than a data center, such as data centers 502A-B. While in this example, each of the data centers 502A-B can include thousands or tens of thousands of devices to be managed, a branch office may have one or more devices to be managed (e.g., 1-100 devices). As an example and in one embodiment, enterprise may be a financial enterprise that includes two or three data centers and 1000 or more branch offices that serve customers. In this example, the automation controller would receives state updates for the devices 508A-N and 510A-N in the data centers 502A-B from the synchronization controllers 506A-B and would additionally receive state change updates from devices 512A-N. In one embodiment, the state change updates from the devices 512A-N can be some of all of the state change updates that occur for each of these devices 512A-N. For example and in one embodiment, each device 512A-N would send all of the state change updates except for the forwarding state changes to the automation controller 504.

Similar as described in FIG. 2 above, the automation controller 504 builds an overall state of the network 500 form the received state change updates and uses this overall network state to automate tasks for the data centers 502A-B and the branch office 516. In one embodiment, the automation controller 104 can further automate tasks to be performed over the multiple data centers 502A-B and branch office 516. Examples of these tasks can include: device software upgrade/downgrade, bug vulnerability detection, network performance monitoring, and/or other types of network automation tasks. In this embodiment, with the view of the network, the automation controller 504 can schedule these tasks to be performed in a manner that reduces the impact of the tasks to the operation of the data centers 502A-C. For example and in one embodiment, the automation controller 504 can have a task to upgrade the firmware of the network elements in the data centers 502A-B and the branch office 516. In this example, a straightforward scheduling of the network element firmware upgrades can have a severe impact on the performance of ongoing operations in the data centers 502A-B and/or branch office 516. Upgrade of network element firmware can cause the network element to have some downtime, where this downtime could impact on the data center operation.

In one embodiment, because the automation controller 504 has the overall state of the network 500, the automation controller can schedule the task to be performed over the network 500 so as to minimize disruptions in the operations supported by the data centers 502A-B and branch office 516. As described above, the automation controller 504 can schedule the task for different data centers 502A-B one by one or all of them as needed, depending on the resource usage of the data centers 502A-B. In addition, the automation controller 504 can schedule the task to be performed on the each of the devices in the branch office 516 as well. For example and in one embodiment, if the task is a software upgrade/downgrade on the network element in the network 500, the automation controller 504 can perform the software upgrade/downgrade on the network elements in the data centers 502A-B followed by the software upgrade/downgrade being performed on the network elements in the branch office 516. Alternatively, if the branch office 516 is associated with a particular data center, say data center 502A, the automation controller can perform the upgrade on network elements in the data center 502A, followed by the software upgrade/downgrade on the network elements in the branch office 516, and followed by the software upgrade/downgrade on the network elements in the data center 502B.

Figure 6:
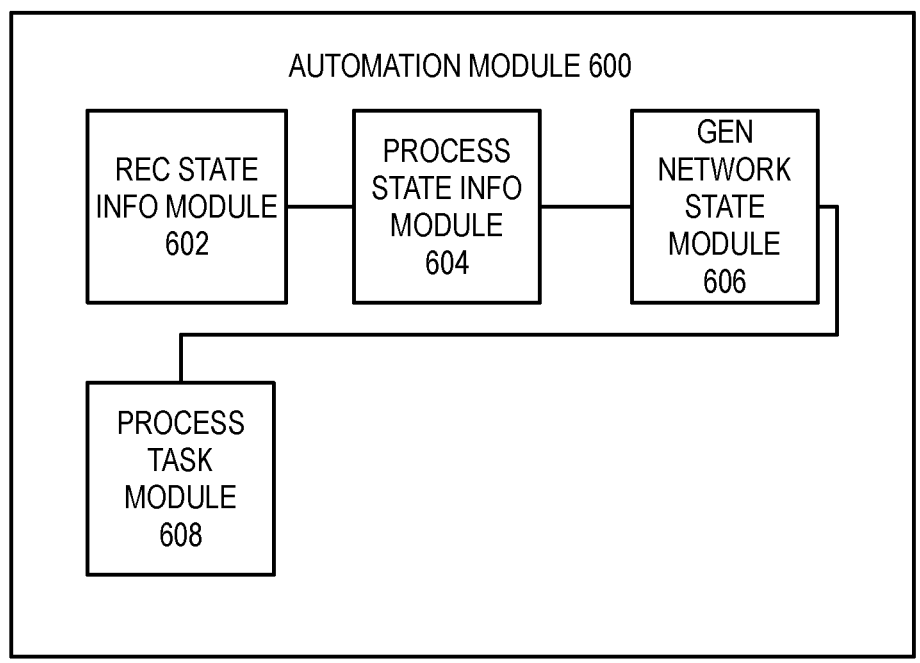
FIG. 6 is a block diagram of one embodiment of an automation module that performs an automated task across multiple data centers.

As described above, the automation controller 104 can perform an automation of a task across multiple data centers and/or branch offices. FIG. 6 is a block diagram of one embodiment of an automation module 600 that performs an automated task across multiple data centers. In one embodiment, the automation module 600 includes receive state change information module 602, process state change information module 604, generate network state 606, and process task 608. In one embodiment, the receive state change information module 602 receives the state change information as described in FIG. 4, block 402 above. The process state change information module 604 processes the received state change information as described in FIG. 4, block 404 above. The generate network state 606 generates an overall network state as described in FIG. 4, block 406 above. The process task 608 processes the task to determine which of the data centers and/or branch offices have the applied as described in FIG. 4, blocks 410-418 above.

Figure 7:
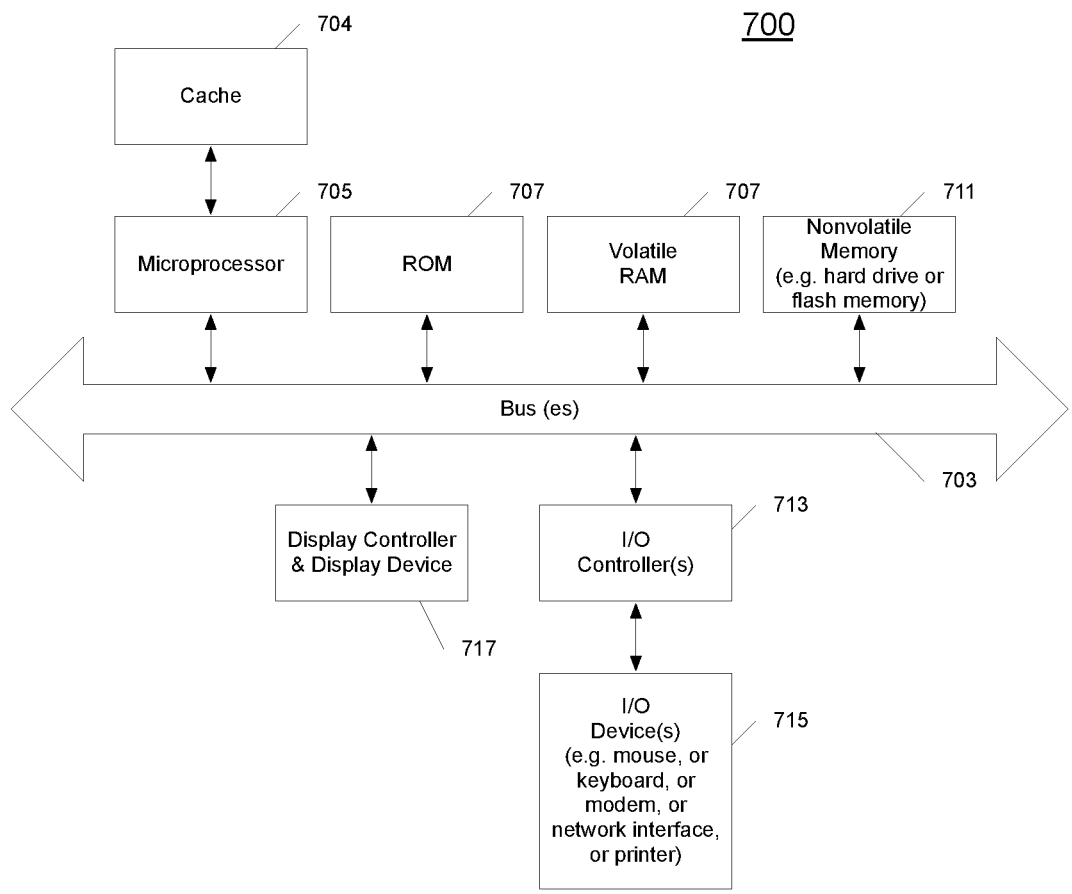
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including an automation controller 104 as shown in FIG. 1 above. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. In one embodiment, the system 700 includes a plurality of network interfaces of the same or different type (e.g., Ethernet copper interface, Ethernet fiber interfaces, wireless, and/or other types of network interfaces). In this embodiment, the system 700 can include a forwarding engine to forward network date received on one interface out another interface.

Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
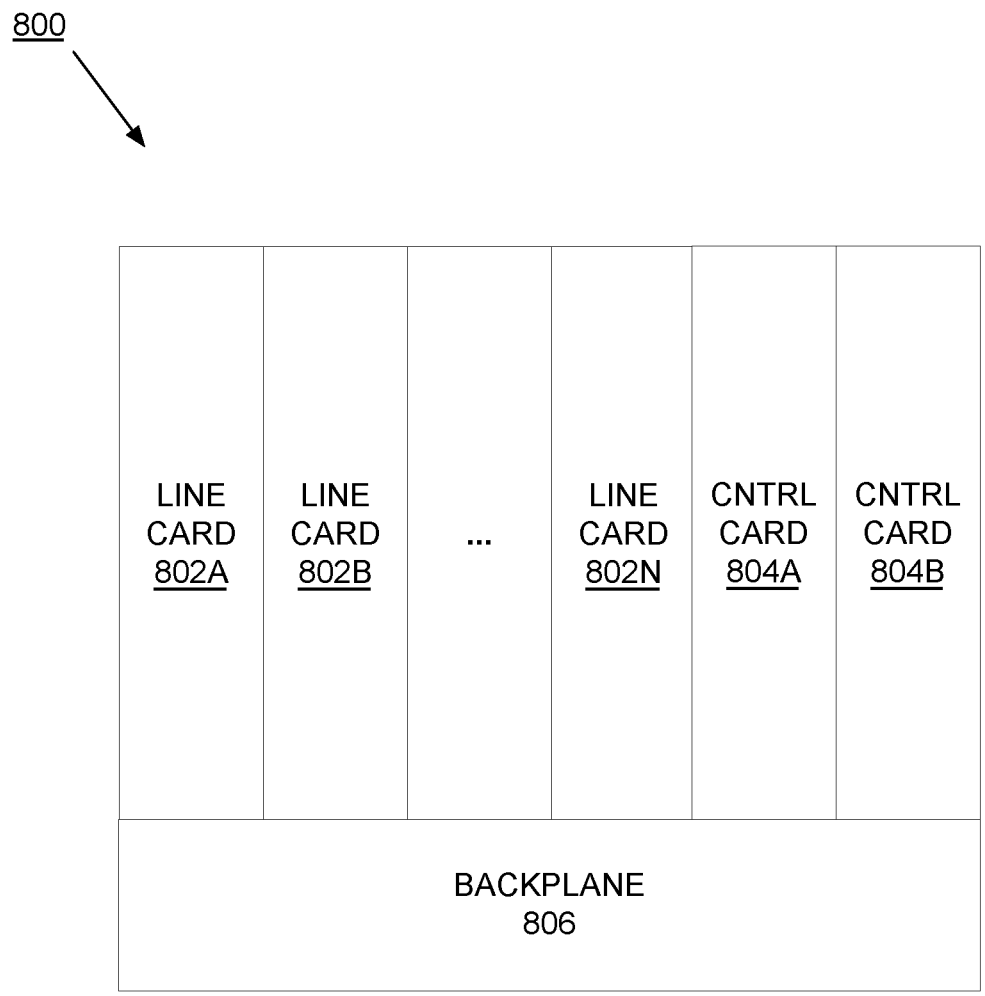
FIG. 8 is a block diagram of one embodiment of an exemplary network element 800 that automates tasks over multiple data centers.

FIG. 8 is a block diagram of one embodiment of an exemplary network element 800 that automates tasks over multiple data centers. In FIG. 8, the backplane 806 couples to the line cards 802A-N and controller cards 804A-B. While in one embodiment, the controller cards 804A-B control the processing of the traffic by the line cards 802A-N, in alternate embodiments, the controller cards 804A-B, perform the same and/or different functions (e.g., automating tasks over multiple data centers). In one embodiment, the controller cards 804A-B automates tasks over multiple data centers as described in FIGS. 1, 2 and 5. In this embodiment, one or both of the controller cards 804A-B include automation module, such as the automation module 600 as described in FIG. 6 above. It should be understood that the architecture of the network element 800 illustrated in FIG. 8 is exemplary, and different combinations of cards may be used in other embodiments of the invention.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "determining," "scheduling," "configuring," "performing," "reconfiguring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to automate a task over a network that includes a plurality of data centers, each of the plurality of data centers including a different plurality of devices, the method comprising:
receiving a set of state change information from a plurality of synchronization controllers corresponding to the plurality of data centers;
generating an overall state for the network, the overall state of the network indicating a respective resource usage of the plurality of data centers;
receiving the task to be performed over the plurality of data centers, wherein the task includes an upgrade; and
scheduling the task to be performed using the overall state for the network, the scheduling including:
determining that a resource usage of a first data center of the plurality of data centers is below a threshold such that a resource usage of a second data center of the plurality of data centers leaves sufficient resources available to handle service requests of the first data center without impacting operations of the second data center, wherein the first data center, the second data center, and a third data center of the plurality of data centers are in respective initial configurations;
configuring the first data center and the second data center such that the second data center handles service requests for the different plurality of devices associated with the first data center;
upgrading the different plurality of devices associated with the first data center;
determining that the resource usage of the second data center is below the threshold such that a resource usage of the third data center leaves sufficient resources available to handle service requests of the second data center without impacting operations of the third data center;
configuring the second data center and the third data center such that the third data center handles service requests for the different plurality of devices associated with the second data center;
upgrading the different plurality of devices associated with the second data center; and
configuring the first data center, the second data center, and the third data center to the respective initial configurations.

2. The non-transitory machine-readable medium of claim 1, wherein the overall state for the network further includes characteristics selected from the group consisting of resource usage of each individual device in the network, configuration settings of each of the devices in the network, topology of each data center, topology of the network that includes the data centers, error counters, and fault indications.

3. The non-transitory machine-readable medium of claim 2, wherein each device is selected from the group consisting of a computer system, a network element, and a storage system.

4. The non-transitory machine-readable medium of claim 1 wherein:
each of the plurality of data centers includes a respective plurality of devices communicatively coupled to a respective synchronization controller through a first set of communication links;
the set of state change information is received through a second set of communication links; and
the first set of communication links supports higher speeds than the second set of communication links.

5. The non-transitory machine-readable medium of claim 4 wherein:
when the task is performed at least one synchronization controller receives first data responsive to performing steps of the task from at least one device through the first set of communication links,
the method further comprises receiving second data responsive to performing steps of the task from the at least one synchronization controller through one of the second set of communications links, and
an amount of the first data is greater than an amount of the second data.

6. The non-transitory machine-readable medium of claim 1, wherein the task further comprises bug vulnerability detection or network performance monitoring.

7. The non-transitory machine-readable medium of claim 1, wherein a data center is a site that includes up to thousands of devices managed by the synchronization controller.

8. The non-transitory machine-readable medium of claim 7, wherein the received state change information includes the state change updates.

9. A method to automate a task over a network that includes a plurality of data centers, each of the plurality of data centers including a different plurality of devices, the method comprising:
receiving a set of state change information from a plurality of synchronization controllers corresponding to the plurality of data centers;
generating an overall state for the network, the overall state of the network indicating a respective resource usage of the plurality of data centers;
receiving the task to be performed over the plurality of data centers, wherein the task includes an upgrade;
scheduling the task to be performed using the overall state for the network, the scheduling including:
determining that resource usages of at least a first data center of the plurality of data centers is below a threshold such that resource usages of one or more other data centers of the plurality of data centers leave sufficient resources available to handle service requests of the first data center without impacting operations of the one or more other data centers, wherein the first data center and the one or more other data centers are in respective initial configurations;
configuring the first data center and the one or more other data centers such that the one or more other data centers handle service requests for the different plurality of devices associated with the first data center;

upgrading the different plurality of devices associated with the first data center;
configuring the first data center and the one or more other data centers such that the first data center handles service requests for the different plurality of devices associated with the one or more other data centers;
upgrading the different plurality of devices associated with the one or more other data centers; and
configuring the first data center and the one or more other data centers to the respective initial configurations.

10. The method of claim 9, wherein the overall state for the network further includes characteristics selected from the group consisting of resource usage of each individual device in the network-configuration settings of each of the devices in the network, topology of each data center, topology of the network that includes the data centers, error counters, and fault indications.

11. The method of claim 10, wherein each device is selected from the group consisting of a computer system, a network element, and a storage system.

12. The method of claim 9 wherein:
each of the plurality of data centers includes a respective plurality of devices communicatively coupled to a respective synchronization controller through a first set of communication links;
the set of state change information is received through a second set of communication links; and
the first set of communication links supports higher speeds than the second set of communication links.

13. The method of claim 12 wherein:
when the task is performed at least one synchronization controller receives first data responsive to performing steps of the task from at least one device through the first set of communication links,
the method further comprises receiving second data responsive to performing steps of the task from the at least one synchronization controller through one of the second set of communications links, and
an amount of the first data is greater than an amount of the second data.

14. The method of claim 9, wherein the task further comprises bug vulnerability detection or network performance monitoring.

15. The method of claim 9, wherein a data center is a site that include up to thousands of devices managed by the synchronization controller.

16. The method of claim 15, wherein the received state change information includes the state change updates.

17. The method of claim 9, wherein the network further includes a branch office that is a site including up to a hundred devices managed by an automation controller.

18. A system that automates a task over a network that includes a plurality of data centers, each of the plurality of data centers including a different plurality of devices, the system comprising:

a processor; and
a memory communicatively coupled to the processor, the memory storing instructions executable by the processor to perform a method, the method comprising:
receiving a set of state change information from a plurality of synchronization controllers corresponding to each of the plurality of data centers;
generating an overall state for the network, to receive the task to be performed over the plurality of data centers;
receiving the task to be performed over the plurality of data centers, wherein the task includes an upgrade; and
scheduling the task to be performed using the overall state for the network, the scheduling including:
determining that a resource usage of at least a first data center of the plurality of data centers is below a threshold such that a resource usage of a second data center of the plurality of data centers leaves sufficient resources available to handle service requests of the first data center without impacting operations of the second data center, wherein the first data center and the second data center are in respective initial configurations;
configuring the first data center and the second data center such that the second data center handles service requests for the different plurality of devices associated with the first data center;
upgrading the different plurality of devices associated with the first data center;
configuring the first data center and the second data center such that the first data center handles service requests for the different plurality of devices associated with the second data center;
upgrading the different plurality of devices associated with the second data center; and
configuring the first data center and the second data center to the respective initial configurations.

19. The system of claim 18, wherein the overall state for the network further includes characteristics selected from the group consisting of resource usage of each individual device in the network-configuration settings of each of the devices in the network, topology of each data center, topology of the network that includes the data centers, error counters, and fault indications.

20. The system of claim 18 wherein:
each of the plurality of data centers includes a respective plurality of devices communicatively coupled to a respective synchronization controller through a first set of communication links;
the set of state change information is received through a second set of communication links; and
the first set of communication links supports higher speeds than the second set of communication links.

* * * * *